March 10, 1931. J. L. COOLEY 1,795,761
PROCESS OF TREATING HYDROCARBON OIL WITH METALLIC HALIDES
Filed Dec. 1, 1926
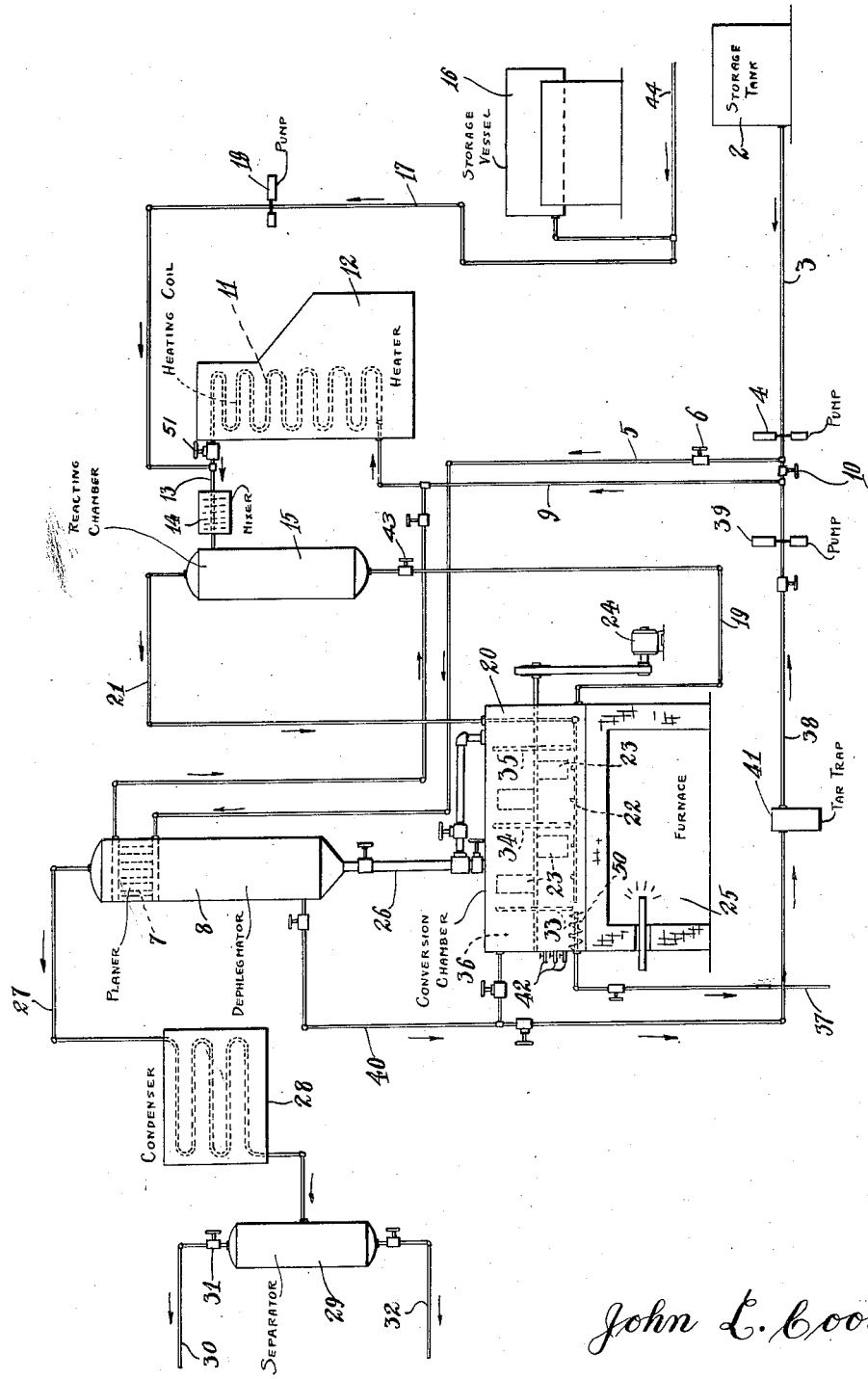
Inventor
John L. Cooley
By Lyon & Lyon
Attorneys Patented Mar. 10, 1931

1,795,761

UNITED STATES PATENT OFFICE

JOHN L. COOLEY, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

PROCESS OF TREATING HYDROCARBON OIL WITH METALLIC HALIDES

Application filed December 1, 1926. Serial No. 151,874.

This invention relates to a process and apparatus for the treatment of hydrocarbon oils by aluminum chloride.

It is the general object of the present invention to provide a process and apparatus for the continual conversion of hydrocarbon oil through reaction with aluminum chloride. More particularly it is an object of the present invention to provide a means for continuously contacting hydrocarbon oil with aluminum chloride. The process and apparatus by which the hydrocarbon oil and aluminum chloride are continuously fed to a reaction chamber and the produced products continuously removed from the chamber, is characterized by the utilization of vapors produced in the process as a means for agitating the hydrocarbon oil and aluminum chloride, in addition to the usual method of mechanical agitation of these materials together.

A further object of the invention is to provide a process and apparatus for treating hydrocarbon oil with aluminum chloride in which the hydrocarbon oil and aluminum chloride are initially mixed together in a flowing stream to effect the initial conversion reaction with the production of vapors therein, which vapors are thereafter utilized as an agitation means for the hydrocarbon oil and aluminum chloride continuously fed into the main reaction chamber.

A further object of the present invention is to provide a process and apparatus in which spent aluminum chloride residue may be continuously separated from the admixture undergoing agitation in the main conversion or reaction chamber.

A further object of the present invention is to provide a process and apparatus by which hydrocarbon vapors may be continuously separated from the unconverted oil undergoing treatment and said hydrocarbon vapors thus continuously removed from the reaction chamber.

A further object of the present invention is to provide a means of controlling the temperature of vapors leaving the system by regulation of the fresh fed oil to the system, thus providing not only a simple means for controlling the vapor discharge for maintaining a uniform product, but for effecting such control with a minimum loss of heat.

A further object of the present invention is to provide a process and apparatus for continuously circulating from the main reaction or conversion chamber oil which has undergone partial conversion through a heating zone and back to said chamber.

A further object of the present invention is to provide a process and apparatus for treating hydrocarbon oil with aluminum chloride, in which all or a greater portion of the heat necessary for the reaction is supplied to the hydrocarbon oil at a point where the oil is separate from the aluminum chloride.

Various further objects and advantages of the present invention will appear from the following description of a preferred form or example of a process of treating hydrocarbon oil with aluminum chloride. For this purpose there is described in the accompanying drawing a preferred form of apparatus embodying the invention, which apparatus may be utilized in the preferred process of the invention.

The drawing represents a diagrammatical elevation partly in vertical section of the preferred apparatus.

Referring to the drawing, the apparatus will be described in connection with the preferred process as conducted therein. In said preferred process, hydrocarbon oil, which may be any oil from shale, coal or petroleum sources, is preferably passed from a storage tank 2 through the line 3 by means of a pump 4 from which the fresh oil supply is preferably split so that a portion thereof has passed through a by-pass line 5, controlled by valve 6, through a planer 7 in the upper end of a dephlegmator 8 and hence returned to the remainder of the feed oil in line 9 controlled by valve 10. From line 9 the hydrocarbon oil is passed to a heating coil 11 maintained within a heater or furnace 12, wherein the oil is preferably heated up to or slightly in excess of the reaction temperature.

As an example of the preferred operating temperature, I prefer to conduct the conversion reaction at a temperature of from 500° to 700° F. and preferably over 550° F. and under 650° F. Accordingly, the hydrocarbon oil is heated in the heating coil 11 to these temperatures or, in certain cases, slightly in excess of said temperatures.

From the heating coil 11 the hydrocarbon oil is passed through line 13 and mixing device 14 to an initial reacting or flashing chamber 15. Simultaneously aluminum chloride in the anhydrous state or other equivalent metallic halide catalyst is withdrawn from storage vessel 16 through line 17 by pump 18 and forced into the hydrocarbon oil flowing in line 13, from which the aluminum chloride and hydrocarbon oil pass into the mixer 14 and are admixed together at a reacting temperature. As a result thereof a partial reaction between the aluminum chloride and hydrocarbon oil takes place with the formation of some light or low boiling point oils. Said low boiling point oils are flashed or distilled from the unconverted oil and aluminum chloride when the admixture passes into the flashing chamber 15. From chamber 15, liquid aluminum chloride and hydrocarbon oil are passed through the line 19 and introduced into the main reaction or conversion chamber 20, preferably entering near one end or the inlet end of said chamber. Simultaneously the separated vapors from the flash chamber 15 are withdrawn through the line 21 and passed into the reaction chamber 20, being discharged therein through a distributor 22 at the lower portion of said still, so that said vapors are caused to rise upwardly through the contents of the still and serve as an agitating means for contacting the aluminum chloride or aluminum chloride tar layer formed therein with the hydrocarbon oil.

The process and apparatus may be operated solely under the agitation effected by said vapors but there is preferably provided within the reaction chamber 20 and agitator or scraper 23 driven by suitable means, such as the motor 24, for the purpose of at least scraping or breaking up the tarry sludge which may deposit in the lower portion of the reaction chamber. By the form of the process and apparatus in which agitation of the contents of reaction chamber 20 is effected at least partially by the vapors formed in the initial portion of the reaction, there is avoided at least the necessity for such violent agitation by mechanical means which is employed in the usual processes. Scraper 23 is of special value for removing coke from the surface of the chamber rather than of agitating the contents of the chamber, and is used to facilitate making the apparatus continuous, and also especially employed where it is desired to pass heat into the admixture at this point of the process.

In certain cases it may be desirable to supply additional heat to the admixture undergoing conversion, and for this purpose the conversion chamber 20 is indicated as mounted over a furnace 25. The low boiling point oils, such as naphtha, that are produced as the product of the boiling process, are preferably continuously vaporized as they are formed and passed through the vapor outlet 26. Preferably disposed near the opposite end of the chamber to that where the feed oil is introduced is a vapor outlet 26 leading to the dephlegmator 8. In certain cases it may be preferable, however, to connect the vapor outlet 26 with the opposite end of the chamber 20, particularly when the chamber 20 is operated under low pressure, so that the quantity of aluminum chloride vaporized with the low boiling point oil will be returned to the chamber at this point. The low boiling point oils which enter the dephlegmator 8 are therein subjected to fractionation to remove therefrom any high boiling point vapors which may have been vaporized therewith. The vapors in the dephlegmator are cooled to the desired discharge temperature by the cooling action of the percentage of feed oil by-passed through the planer 7 through the line 5. The condensed aluminum chloride returns to the chamber 20 through the passage 26 and in case a large amount of aluminum chloride is so vaporized and returned, then the line 26 is preferably connected with the chamber 20 near the inlet end of the chamber. Where the process is operated under sufficient pressure to substantially prevent its vaporization, it may be preferably run through the line 26 near the discharge end of the chamber. The produced naphtha vapors are passed from the dephlegmator 8 through the line 27 to a condenser 28 in which they are condensed and hence passed to a gas separator 29, from which the uncondensed gas passes through a line 30 provided with a valve 31, and the condensed naphtha is withdrawn continuously through the line 32.

In order to provide for efficient continuous operation, the conversion chamber 20 is preferably provided with a plurality of spaced apart baffles 33, 34 and 35, having openings at their upper and lower ends for the passage of vapor over them and the passage of tar or the oil tar admixture under the baffles. The baffles operate to cause a regulated flow of tar from the inlet end to the outlet end of the chamber 20, so that the tar may be withdrawn from the outlet end in a spent condition. Preferably, the last compartment 36 of the chamber 20 is left free of any agitating means so that said compartment may operate as a settling or stratifying chamber, and pure aluminum chloride residue or tar may be withdrawn through its lower end through the line 37. In certain cases it may be desirable to reduce all or part of the aluminum chloride residue to a solid material, in which case it is understood that the stratifying chamber 36 will be provided with a mechanical discharging device, such as a screw conveyor 50, for the removal of such material, in which case the discharged residue may contain some hydrocarbon oil.

The stratifying chamber 36 also provides a means by which the hydrocarbon oil may be separated from the admixture for the purpose of recirculating said oil back through the heating coil 11. For this purpose, the stratifying chamber 36 is indicated as connected with the recirculating line 38 leading to the heating coil 11 through the pump 39.

The heavy or high boiling point hydrocarbon oils which are condensed in the dephlegmator 8 may be returned to the conversion chamber 20 through the line 40, but preferably said oils are passed through the recirculating line 38 and pump 39 back through the heating coil 11. Preferably, said recirculating line 38 is made to include a tar trap 41.

In order to permit the employment of high reacting temperatures and to secure more complete separation of naphtha from the heavy oils and aluminum chloride in the conversion chamber, and also to minimize the vaporization of aluminum chloride, the process is preferably maintained under pressure throughout the system. Said pressure may be regulated by the valve 31 on the uncondensed gas outlet line 30, and is usually 15 pounds per square inch or higher. The pressure is thus maintained in conversion chamber 20 and flash chamber 15 and also in the fractionating tower or dephlegmator 8 and condenser 28.

In certain operations it is desirable to have a substantial differential pressure between the oil in heating coil 11 and the oil within conversion chamber 20. For example, in the heating coil 11, I prefer to employ a pressure of 15 pounds per square inch higher than the pressure employed in the conversion chamber 20, the valve 51 being shown for this purpose. Said pressure will permit the oil and aluminum chloride to be injected into the conversion chamber 20 to assist in agitating the charge, and will also permit the vapors from the flash chamber 15 to exert a greater agitating effect. When operating in this manner, a valve 43 is provided in line 19 to regulate the flow of the oil, aluminum chloride mixture to chamber 20. The differential pressure also permits the oil in heating coil 11 to be preheated to the desired reaction temperature. There is also preferably provided on the stratifying chamber 36 suitable indicating means, such as a plurality of vertically spaced apart petcocks 42, whereby a substantial quantity of aluminum chloride tar may be maintained within the conversion chamber 20. The passage of residual tar is preferably carried on to maintain a substantially uniform level of tar in the reaction chamber.

An important feature of the present invention is the ability to carry on the conversion of a hydrocarbon oil by aluminum chloride continuously, with efficient utilization of heat and without the necessity of employing violent forced agitation.

The line 44 in the drawing is indicated for adding oil to the aluminum chloride entering line 17. Aluminum chloride is a solid material and is not a pumpable material except when mixed with sufficient oil. If the aluminum chloride in vessel 16 does not contain sufficient oil to be pumpable, oil may be added by line 44.

While the particular process and apparatus herein described is well adapted for carrying out the objects of the present invention, it is understood that various modifications, changes and substitution of equivalents may be made without departing from the present invention, and the invention includes all such modifications, changes and substitution of equivalents as come within the scope of the appended claims.

I claim:—

1. A process of treating hydrocarbon oil with aluminum chloride, which includes mixing the aluminum chloride and hydrocarbon oil together in a flowing stream at a temperature sufficient to cause the same to react to form relatively low boiling point oil, passing the stream to a flash zone, therein separating produced low boiling point vapors from the liquid oil and aluminum chloride, and passing a stream of said vapors and a separate stream of the said oil and tar to a conversion zone, therein contacting said vapors while still heated again with the oil-tar admixture for agitating the same while maintaining the admixture at a temperature suitable for effecting a decomposing reaction.

2. A process of treating hydrocarbon oil with aluminum chloride, which comprises first heating hydrocarbon oil in a flowing stream to a reaction temperature, then adding to the stream aluminum chloride, then separating from the admixture the produced vapors, passing the oil and tar to a main conversion zone, and separately passing into said conversion zone said vapors, said vapors being injected into the body of the oil and aluminum chloride for agitating the same while maintaining the admixture at a temperature suitable for effecting a decomposing reaction.

3. A process of treating hydrocarbon oil with aluminum chloride, which comprises first contacting the hydrocarbon oil and aluminum chloride to form an initial conversion process, separating therefrom vapors of the converted products, passing the residual hydrocarbon oil and aluminum chloride to a main reaction zone, therein agitating the same by introducing said separated vapors, and heating the materials within said conversion chamber to a reaction temperature.

4. A process of treating hydrocarbon oils, which comprises heating the majority of said hydrocarbon oil in a flowing stream, admixing aluminum chloride with said stream to effect an initial conversion, separating therefrom vapors of the converted products, passing the residual oil and aluminum chloride to a reaction zone while in a still heated condition, there introducing the said separated vapors, heating to a reaction temperature, passing the aluminum chloride and unconverted oil to a stratifying chamber, and continuously withdrawing therefrom the aluminum chloride residual.

5. A process of treating hydrocarbon oil with aluminum chloride, which comprises initially contacting hydrocarbon oil and aluminum chloride at a reaction temperature, separating from the residual admixture converted oils as vapors, passing the admixture to a conversion zone, therein introducing the separated vapors for agitating the mixture while maintaining the admixture at a reaction temperature, and simultaneously mechanically scraping the solidified residue in the chamber to break up coke formed.

6. A process of treating hydrocarbon oil with aluminum chloride, which comprises separately heating the majority of said oil, admixing said oil with aluminum chloride at a reaction temperature, then separating from the admixture produced relatively low boiling point oil as vapors, then passing the residual admixture to a main reaction zone wherein the admixture is maintained at a conversion temperature and at a pressure above atmospheric, therein injecting said separated vapors, passing a part of said admixture therefrom into a stratifying zone, and separating spent aluminum chloride residue therefrom.

7. An apparatus for treating hydrocarbon oil with aluminum chloride, comprising a mixer, a flash chamber connected to receive an aluminum chloride hydrocarbon admixture from said mixer, a conversion chamber, means for passing aluminum chloride and hydrocarbon oil from said flash chamber to said conversion chamber, and means for introducing into the charge in said conversion chamber vapors from said flash chamber.

8. An apparatus for treating hydrocarbon oil with aluminum chloride, which comprises a heating coil and a mixer connected therewith, a flash chamber connected with said mixer, and a reaction chamber, means for passing vapors from said flash chamber to said reaction chamber, and a separate line for passing liquids to said reaction chamber from said flash chamber.

Signed at Richmond, California, this 18th day of November, 1926.

JOHN L. COOLEY.